United States Patent
Tosaka et al.

[11] Patent Number: 6,015,953
[45] Date of Patent: Jan. 18, 2000

[54] TENSION CLAMP FOR STRANDED CONDUCTOR

[75] Inventors: Shigeru Tosaka; Syuji Tachizaki; Kouetu Sato, all of Sendai; Yoshihiro Takahashi, Miyagi-ken; Hiroshi Kimura, Chiba-ken; Hiroshi Tajima, Tochigi-ken; Haruki Susukida, Yokohama; Jun Sato, Saitama-ken; Masakazu Kojima, Tokyo; Hirotoshi Ebiko, Kanagawa-ken; Takeshi Ito, Yokohama, all of Japan

[73] Assignees: Tohoku Electric Power Co., Inc., Sendai; Tokyo Rope Mfg. Co; Sanwa Tekki Corporation, both of Tokyo; Showa Electric Wire & Cable Co. Ltd., Kawasaki, all of Japan

[21] Appl. No.: 08/827,473

[22] Filed: Mar. 28, 1997

Related U.S. Application Data

[63] Continuation of application No. 08/403,001, Mar. 10, 1995, abandoned.

[30] Foreign Application Priority Data

| Mar. 11, 1994 | [JP] | Japan | 6-040994 |
| Mar. 11, 1994 | [JP] | Japan | 6-040995 |
| Feb. 24, 1995 | [JP] | Japan | 7-036703 |
| Feb. 24, 1995 | [JP] | Japan | 7-036704 |

[51] Int. Cl.⁷ ............................................. H01R 4/18
[52] U.S. Cl. ................... 174/79; 174/84 C; 174/90; 174/93; 439/882
[58] Field of Search ............................. 174/74 R, 79, 174/84 C, 90, 82, 74 A, 93; 439/882

[56] References Cited

U.S. PATENT DOCUMENTS

| 4,214,121 | 7/1980 | Charneski et al. | 174/84 |
| 4,438,293 | 3/1984 | Voser | 174/79 |
| 4,453,034 | 6/1984 | Annas et al. | 174/79 |
| 4,645,867 | 2/1987 | Annas | 174/79 |
| 4,649,080 | 3/1987 | Fischer et al. | |
| 4,790,626 | 12/1988 | Bunicel et al. | |
| 4,829,146 | 5/1989 | Duve | 174/94 R |

FOREIGN PATENT DOCUMENTS

| 1133000 | 7/1962 | Germany | 174/79 |
| 60-177626 | 11/1985 | Japan. | |
| 61-46827 | 3/1986 | Japan. | |
| 5-47423 | 2/1993 | Japan. | |

*Primary Examiner*—Kristine L. Kincaid
*Assistant Examiner*—Marc Diamant Machtinger
*Attorney, Agent, or Firm*—Henderson & Sturm

[57] ABSTRACT

An end of a conductor having a stranded conductor layer wound around a tension member made of resin-reinforced carbon fiber is cut back to expose the end of the tension member. The exposed end of the tension member is inserted into a metal fitting having multiple longitudinal slits. A metal sleeve is then fit over the metal fitting and also partially over the stranded conductor layer before compress-fitted into place. Accordingly, it is possible to attach, with good workability and sufficient tensile strength, a conductor that has a tension member made of resin-reinforced carbon fiber.

24 Claims, 4 Drawing Sheets

TENSION CLAMP FOR STRANDED CONDUCTOR

This is a continuation of application Ser. No. 08/403,001 filed Mar. 10, 1995, now abandoned, the disclosure of which in its entirety is incorporated by reference herein.

BACKGROUND OF THE INVENTION

1. Field of the Invention

The present invention relates to a tension clamp for stranded conductor a nd particularly to a tension clamp for stranded conductor used for low-sag type overhead power transmission lines and having a tension member comprised mainly of carbon fiber.

2. Description of the Related Art

Developed and gaining attention in recent years has been low-sag type stranded conductor, in which sag, particularly that at high temperatures, is suppressed by using carbon fiber, a light material with a low coefficient of thermal expansion, that has been bonded and reinforced with resin, as tensioning members.

However, with at least one type of stranded conductor, there is a problem in that, if a steel sleeve is directly compressed over a tension member when anchoring the stranded conductor to a tension clamp, as is the case when using stranded conductor that utilizes a conventional steel-core tension member, such as aluminum conductor reinforced with steel, the resin-bonded carbon fiber such as carbon fiber, reinforced plastic, will be crushed, cracked or otherwise damaged by the strong compressive force of the steel sleeve; and, as a result, the holding force of the steel sleeve will be greatly reduced, and sufficient tensile strength will not be obtained.

SUMMARY OF THE INVENTION

The present invention is directed to a tension clamp a for stranded conductor. The tension clamp of the present invention is able to attach in a practical manner, with good workability, and sufficient tensile strength, to a stranded conductor, and is particularly suitable for attaching to stranded conductors having a tension member preferably comprising carbon fiber; and more preferably a buffer layer or sleeve surrounding the tension member for use with the tension clamp.

In a tension clamp for stranded conductor having a tension member comprising carbon fiber and a stranded conductor layer wound around the tension member, the invention is comprised of:

- a tension member comprising a termination or exposed end section (which is exposed by cutting back a stranded conductor layer from the termination or one terminal end portion or section of the stranded conductor);
- a hard metal sleeve or fitting, preferably made of metal, attached to the exposed end of the tension member, the fitting including a tension member insertion section on a peripheral wall of which forms a slit section comprising multiple longitudinal slits for housing the exposed end section of the tension member within the tension member insertion section; and
- a compression sleeve, preferably made of metal, that is compress-fixed over the tension member insertion section so that slits of the tension member insertion section are closed by compressing the sleeve placed over the fitting and the terminal end section of the stranded conductor layer of the stranded conductor.

Also, the present invention is directed to a tension clamp for a stranded conductor having a tension member comprising carbon fiber and a stranded conductor layer wound around the tension member, wherein the invention is comprised of:

- a termination or terminal end section of the tension member;
- a termination or terminal end section of the stranded conductor layer wound around the tension member;
- a buffer layer interposed between the terminal end section of the tension member and the terminal end section of the stranded conductor layer; and
- a compression sleeve preferably metal, placed over the terminal end section of the stranded conductor layer and compress-fixed into place.

According to the present invention, a tension clamp for stranded conductor may be comprised of:

- a termination or terminal end section of a tension member, exposed by cutting back the stranded conductor layer from the termination of the stranded conductor;
- a hard metal sleeve or fitting, preferably metal, attached to the terminal end section of tension member and having a tension member insertion section, wherein the fitting houses the terminal end section of the tension member within the tension member insertion section;
- a resin packing section comprising cure-hardening resin, packed and solidified between the fitting and the terminal end section of the tension member;
- a buffer layer interposed between the terminal end section of the stranded conductor layer and the terminal end section of the tension member; and
- a compression sleeve, preferably metal, placed over the fitting and a terminal end section of the stranded conductor layer of the stranded conductor and compress-fixed into place.

In some embodiments of the present invention, the compression sleeve is compressed to become compressed-fixed or fitted into place over to an area above the strands and, excepting the above the metal sleeve but not over the resin packing section.

For purposes of the present invention, the buffer layer may be comprised of wrappings of soft material, such as wrappings of paper, wrappings of string made from natural or synthetic fiber, wrapping of non-woven fabric or wrappings of other soft material; or a metal coating, such as a metal die casting. It is also possible to use a buffer layer e.g. in the form of a sleeve, that is a cylindrical body, preferably metal, having a split structure in the form of semi-cylindrical parts, and having mating surfaces formed on its inner periphery that mate to the previously described outer periphery of the tension member. Buffer layers or sleeves that are formed from a metal having zinc as its main constituent or a metal having aluminum as its main constituent are especially desirable because of their superior buffering action and their ease of manufacture. A wrapped layer of a soft material, e.g. selected from the group consisting of natural fibers, synthetic fibers, paper, and non-woven fabric, absorbs and alleviates energy from compressing the metal sleeve and prevents compressive force from propagating to or impacting the carbon fiber inside. Likewise, a metallic shielding or buffer layer, whether die-cast or composed of two semi-cylindrical sections, blocks compressive force from the metal sleeve and prevents compressive force from propagating or to impacting the carbon fiber inside.

In the present invention, for purposes of the fitting hard metal sleeve attached to the exposed end of the tension member, a steel sleeve is, from the aspect of strength, preferable. However, from the aspect of corrosion prevention, a fitting or sleeve of aluminum or an aluminum alloy may be used, in which case the strands of the stranded conductor are made of aluminum or aluminum alloy.

Also, for purpose of the present invention, higher effectiveness is obtained especially when the stranded conductor is comprised of resin-reinforced carbon fiber having a tension member made by bonding carbon fiber with resin. However, the invention is not limited to such a stranded conductor.

According to a first aspect of the invention, a tension member exposed by cutting back a portion of its stranded conductor layer covering is inserted into a fitting, or hard metal sleeve comprising a slit section having multiple longitudinal slits over which is fit a aluminum or aluminum alloy compression sleeve, that is then fixed in place by compression. Inasmuch as the pressure applied when compressing the compression sleeve is absorbed and alleviated by shutting the slits in the slit section of the fitting, compressive force is absorbed and alleviated, and the force applied to the tension member is greatly reduced. Consequently, damage will not occur to the resin-reinforced carbon fiber that comprises the tension member; and furthermore, because the compression sleeve and the fitting exhibit sufficient holding strength, a high tensile strength will be held overall.

Also, in forming, a hard metal sleeve of fitting can be compressed and fixed into position without compressing it directly but rather by compressing an outer aluminum or aluminum alloy compression sleeve; consequently, compression work can be completed in one operation, thereby making it possible to shorten working time and reduce manpower requirements.

According to another aspect of the invention, because a buffer layer has been placed between an outer stranded conductor layer and an inner tension member comprised mainly of carbon fiber over which a metal compression sleeve has been fit on the outside and fixed into place by compression, the compressive force that acts on the tension member when the compression sleeve is compressed is conspicuously reduced by absorption or blockage by the buffer layer. Consequently, a high tensile strength is exhibited without any crushing or cracking of the carbon fiber that forms the tension member.

DESCRIPTION OF THE PREFERRED EMBODIMENTS

Next, with reference to the accompanying drawings, embodiments of the present invention will be described.

Figure 1:
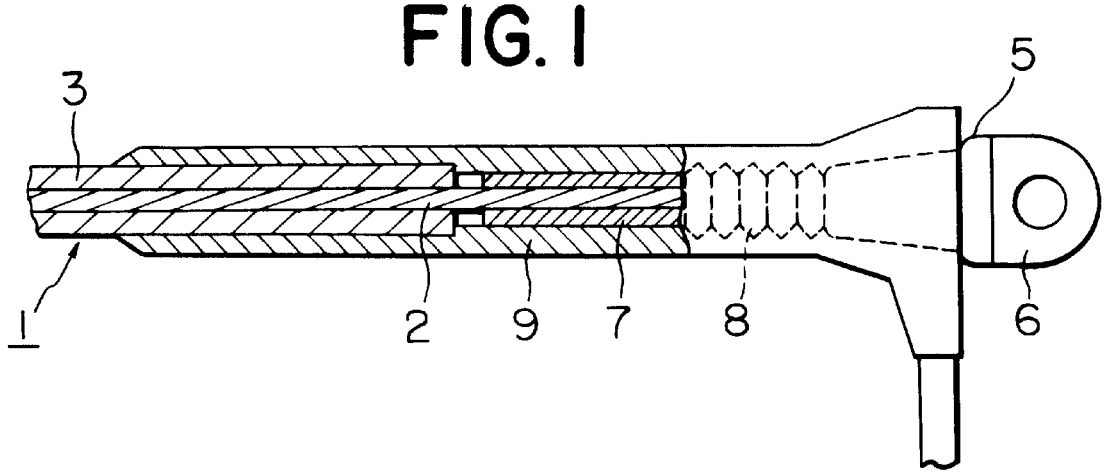
FIG. 1 is a transverse sectional view in part of one embodiment of a tension clamp for stranded conductor of the invention.

FIG. 1 is a transverse sectional view of a first embodiment of a tension clamp for stranded conductor of the invention.

Figure 2:
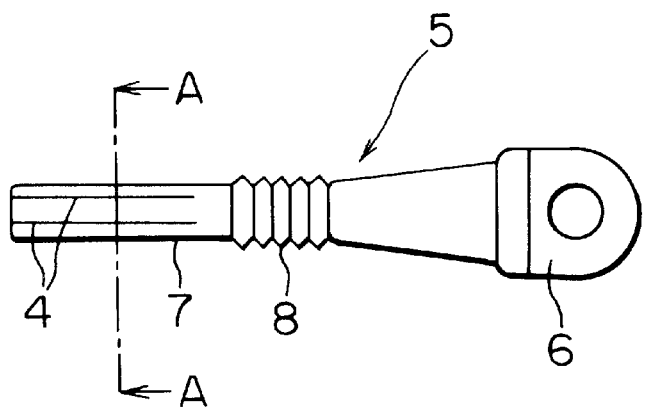
FIG. 2 is a front view of a steel dead-end used in the embodiment.
Figure 3:
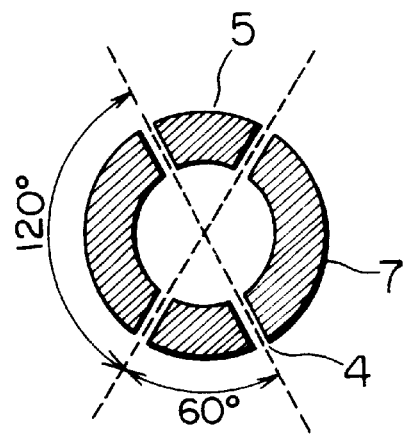
FIG. 3 is a cross-sectional view of section A—A in FIG. 2.
Figure 4:
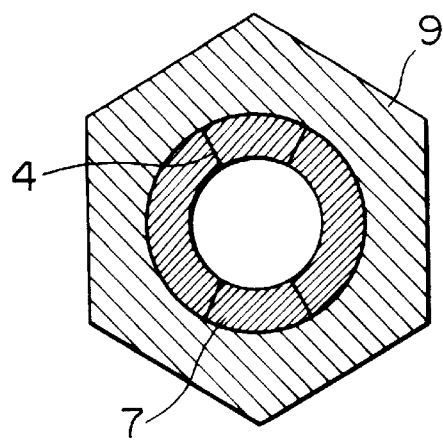
FIG. 4 is a transverse sectional view illustrating compression of the steel dead-end in the embodiment when an aluminum or aluminum alloy sleeve is compressed.

In the drawing, the number 1 indicates a stranded conductor. The stranded conductor 1 has a stranded conductor layer 3 such as aluminum or an aluminum alloy wire wound around a tension member 2 of multiple stranded resin-reinforced carbon fibers in which carbon fibers are bonded by a resin such as heat-resistant epoxy resin. A termination of the stranded conductor 1 is cut back to expose tension member 2. The exposed section of tension member 2, referred to herein for clarity as exposed tension member or exposed section 2a, is inserted into an eye-type steel dead-end 5 having slits 4 as described below. That is, the steel dead-end 5 is, as shown in FIG. 2 and FIG. 3, made up of eye-type termination fixture 6 and a connecting tension member insertion section 7. On the peripheral wall of tension member insertion section 7 is formed a slit section having four longitudinal slits 4; and, at nearly the center on the outer periphery are formed helical or ringed corrugations 8. As for the position of the four slits 4, it is preferable to place the slits 4 at alternating angular spacings of 60 degrees and 120 degrees, rather then at an equal angular spacing along the periphery or, in other words, at an angular spacing of 90 degrees.

Astride stranded conductor layer 3 and on the outside of tension member 2 over which steel dead-end 5 has been fit is fit an aluminum or aluminum alloy sleeve 9, which is then fixed in placed by compressing from the outside in a cross-sectional hexagonal shape.

This tension clamp is formed as follows.

First, a termination of stranded conductor 1 is cut back to expose tension member 2, made up of resin-reinforced carbon fiber. The exposed section is inserted into tension member insertion section 7 of steel dead-end 5. Afterwards, aluminum or aluminum alloy sleeve 9 is fit over the outside. Next, aluminum or aluminum alloy sleeve 9 is compressed from the outside to a substantially hexagonal cross-sectional shape, thereby fixing it in place over steel dead-end 5 and stranded conductor 1.

In a tension clamp for stranded conductor of the embodiment, steel dead-end 5, on which is formed a slit section having four longitudinal slits 4, is fit over the outside of the exposed section 2a of tension member 2, exposed by cutting back a termination of stranded conductor 1, and over this is fit an aluminum or aluminum alloy sleeve 9, which is then fixed in place by compression; therefore, the pressure applied when compressing aluminum or aluminum alloy sleeve 9 is absorbed and alleviated by shutting slits 4 of steel dead-end 5, and the force applied to tension member 2 is greatly reduced. Especially in cases in which the four longitudinal slits 4 are placed at alternating angular spacings of 60 degrees and 120 degrees as shown in FIG. 3, if the slits 4 are placed at a position corresponding to compression surfaces of aluminum or aluminum alloy sleeve 9, the compressive force will act uniformly toward the center of tension member insertion section 7 of steel dead-end 5; thereby, slits 4 will all shut substantially uniformly, and the compressive force will be absorbed and alleviated with maximum effectiveness. Consequently, damage will not occur to the resin-reinforced carbon fiber that comprises tension member 2. Furthermore, aluminum or aluminum alloy sleeve 9 will exhibit sufficient holding strength. Particularly when corrugations 8 are placed on steel dead-end 5 as described above, an even stronger holding strength is exhibited. Because of these features, it is possible to obtain a high tensile strength overall and to use the embodiment to achieve highly reliable anchoring.

Also, because steel dead-end 5 is not compressed directly but rather is compressed and fixed into position by compressing an outer aluminum or aluminum alloy sleeve 9 around the tension member insertion section 7 of steel dead-end 5, compression work can be completed in one operation, thereby making it possible to shorten working time and reduce manpower requirements.

Furthermore, in the embodiment explained above, tension member insertion section 7 of steel dead-end 5 is directly fit over tension member 2; but the invention is not limited to such an embodiment, and steel dead-end 5 may be fit over a suitable buffer layer. While workability will decline somewhat, one can obtain a tension clamp of high tensile strength. Also, a buffer layer may be placed between the termination of stranded conductor layer 3 and tension member 2. Listed by example as suitable buffer layers are: those, as described later, formed by wrapping non-woven fabric around tension member 2 or by die casting zinc or other metal; and buffer sleeves.

Next is explained another embodiment of the invention.

Figure 5:
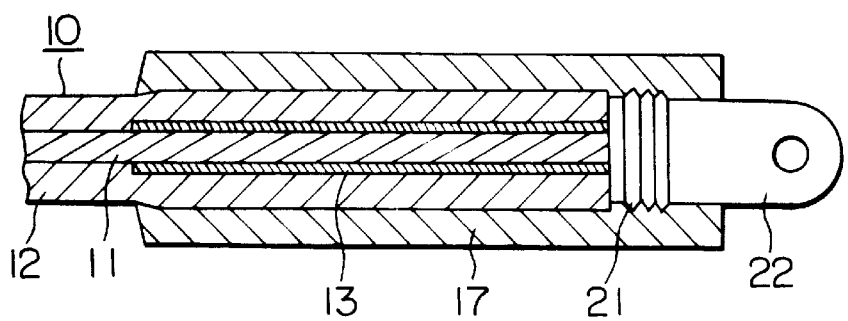
FIG. 5 is a longitudinal sectional view showing another embodiment of a tension clamp for stranded conductor of the invention.

FIG. 5 is a longitudinal sectional view showing a second embodiment of a stranded conductor tension clamp of the invention.

In the drawing, the number 10 indicates a stranded conductor having a stranded conductor layer 12, such as aluminum or an aluminum alloy, wound around a tension member 11 of multiple stranded resin-reinforced carbon fibers in which carbon fibers are bonded by a resin. At a termination or terminal end portion or section of the stranded conductor, between tension member 11 and stranded conductor layer 12, is placed over the entire periphery buffer layer 13 configured as described below.

Figure 6A:
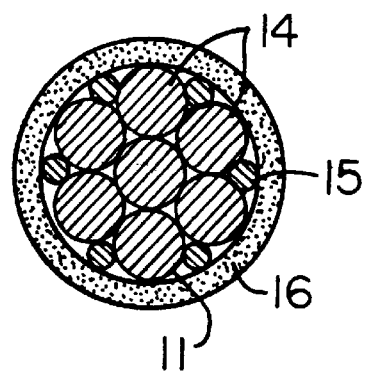
FIG. 6A is a transverse sectional view showing one example of a buffer layer in the invention.
Figure 6B:
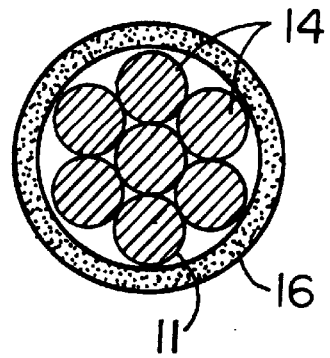
FIG. 6B is a transverse sectional view showing another example of a buffer layer in the invention.

That is, as shown in FIG. 6, within twist grooves of resin-reinforced carbon fiber 14 that comprise tension member 11 are embedded strings 15 made of aramid fiber; and around these is placed a wrapped layer 16 of non-woven fabric. Buffer layer 13, made of a soft material like this, absorbs and alleviates force applied when aluminum or aluminum alloy sleeve 17, described later, is compressed. Here, strings 15 made of aramid fiber are effective for forming a circular cross section but are not always necessary in terms of absorbing and alleviating compressive force. Consequently, buffer layer 13 may, as shown in FIG. 6B, be comprised only of wrapped layer 16 of non-woven fabric; and with this a sufficient buffer effect can be obtained.

Figure 7:
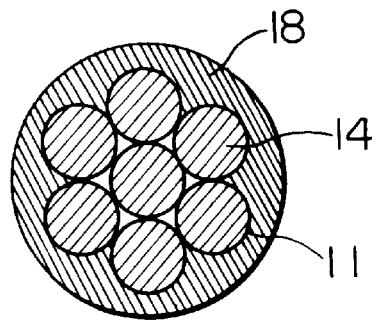
FIG. 7 is a transverse sectional view showing another example of a buffer layer in the invention.

Also, as shown in FIG. 7, buffer layer 13 can be configured so that a metal die casting layer 18 comprised mainly of zinc or zinc alloy is tightly fit and formed so that the area around tension member 11 forms a circular cross section and so that compressive force from aluminum or aluminum alloy sleeve 17 is absorbed. Furthermore, in cases in which metal die casting layer 18 is provided as buffer layer 13, it is desirable that edges on the non-terminal side of metal die casting layer 18 be given a taper so that strands placed over die casting layer 18 do not break during compression.

Figure 8A:
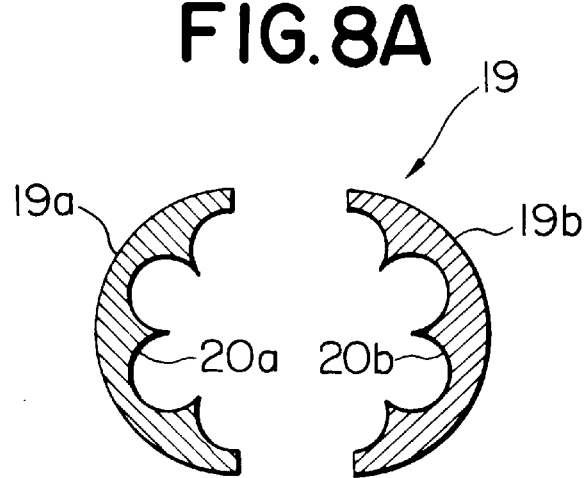
FIG. 8A is a transverse sectional view showing one embodiment of a buffer sleeve of the invention.
Figure 8B:
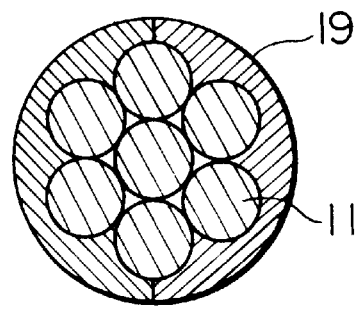
FIG. 8B is a transverse sectional view showing the buffer sleeve of FIG. 8A as mated over a tension member.

It is also possible to use for buffer layer 13 a buffer sleeve 19 having a split structure like that shown in FIG. 8A. As shown in the figure, the buffer sleeve 19 is made up of symmetrical semi-cylinders or buffer sleeve parts 19a and 19b, that are formed from a metal having zinc as its main constituent or a metal having aluminum as its main constituent, i.e. zinc alloy or aluminum alloy, and furthermore that have formed on their inner periphery mating surfaces 20a and 20b, that mate to the outer periphery of tension member 11. FIG. 8B is a transverse sectional view showing buffer sleeve 19 with buffer sleeve parts 19a and 19b mated over the outer periphery of tension member 11.

Of these different types of buffer layers 13, a buffer layer 13 made of soft material is easier to form and work on site than a metal die casting layer 18. These tasks become even easier in cases in which a buffer sleeve 19 is used.

As shown in FIG. 5, the termination surface of stranded conductor 10, of terminal end section of stranded conductor 10, in which has been inserted buffer layer 13, is butted against a termination surface of eye-type steel dead-end 22, on the outer surface of which has been formed helical or ringed corrugations 21. Surrounding stranded conductor layer 12, buffer layer 13, tension member 11, and dead-end 22, on the outer side of these elements, is an aluminum or aluminum alloy sleeve 17, made of aluminum or an aluminum alloy, that is fit on stranded conductor layer 12 over buffer layer 13 tension member 11, and on corrugations 21 of eye-type steel dead-end 22, and then fixed in place by compression. It is preferable that buffer sleeve 19 be formed by die casting.

A stranded conductor tension clamp of the structure shown in FIG. 5 is configured, for example, as follows.

First, stranding of stranded conductor layer 12 at the termination of stranded conductor 10 is untwisted to expose tension member 11 inside. Next, strings 15 made of aramid fiber are embedded along the exposed outer periphery of tension member 11; around the strings 15 is provided a layer either by wrapping non-woven fabric cloth 16, by providing a metal die casting layer 18, or by mating with a buffer sleeve 19 manufactured beforehand in a factory so as to provide a buffer layer 13; and then above or around buffer layer 13 is retwisted the stranding that was untwisted earlier. Afterwards, eye-type steel dead-end 22 is placed in opposition to, so as to abut, the termination or terminal end portion or section of stranded conductor 10, then aluminum or aluminum alloy sleeve 17 is fit over the outside of these elements, i.e. stranded conductor 10 and dead-end 22, and compression is applied from outside to fix them in place as a unit.

In a stranded conductor tension clamp conductor cable configured in the manner, described herein, the compressive force load on tension member 11 that occurs when aluminum or aluminum alloy sleeve 17 is compressed, is absorbed or blocked, because buffer layer 13, made of either soft material or hard metal, has been placed between stranded conductor layer 12 and tension member 11; thereby, crushing, cracking or other damage to the resin-reinforced carbon fiber that comprises tension member 11 is minimized or prevented. As a result, stranded conductor 10 is attached to dead-end 22 with sufficient tensile strength.

Particularly advantageous is that buffer sleeve 19 can be manufactured beforehand in a factory, so that, for on-site work, all that need be done is untwist the stranding and mate buffer sleeve parts 19a and 19b of buffer sleeve 19 over exposed tension member 11; furthermore, because buffer sleeve 19 is of a split structure comprising buffer sleeve parts 19a and 19b, buffer sleeve 19, it can be accurately attached almost instantaneously, thereby greatly reducing on-site work time.

In addition, as to forming the assembly shown in FIG. 5, there is no need to cut and remove stranded conductor layer 12; instead, all that need be done, once the stranding has been untwisted, is to separate and spread out the strands, place buffer layer 13 over exposed tension member 11, and once again retwist the strands over it. Thereby, there is no need to carry out cutting-back work to cut and remove a portion of stranded conductor layer 12; and the time and effort required for work can be greatly curtailed.

Moreover, because a termination or terminal end portion or section of eye-type steel dead-end 22 has been provided with corrugations 21, the area of contact with aluminum or aluminum alloy sleeve 17, which is fit over the outside, becomes larger; and a stronger compression-fix is obtained.

Figure 9:
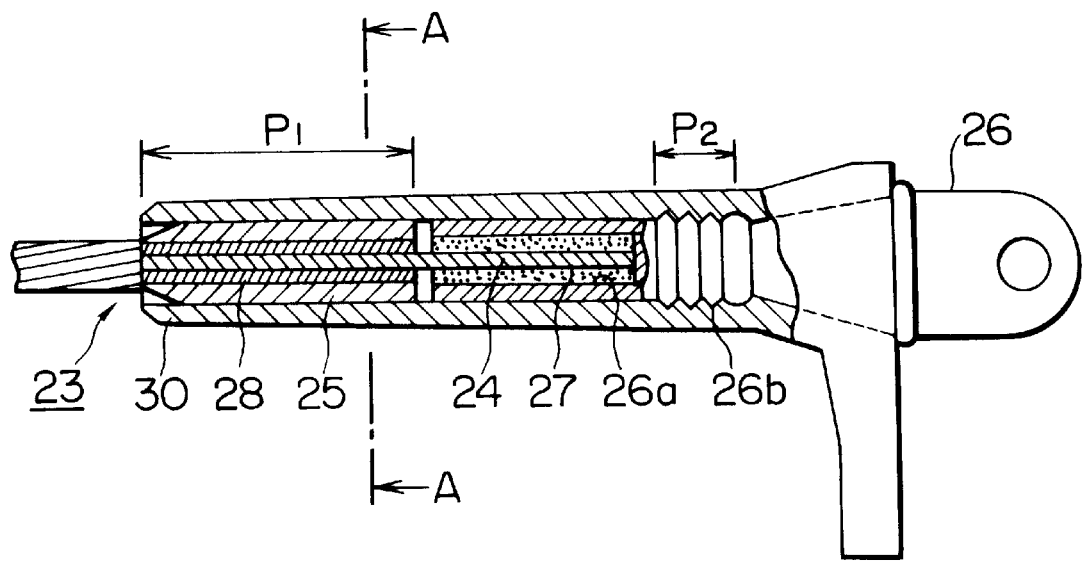
FIG. 9 is a longitudinal sectional view showing yet another embodiment of a tension clamp for stranded conductor of the invention.

FIG. 9 is a longitudinal sectional view showing a third embodiment of a tension clamp for stranded conductor of the invention.

Figure 10:
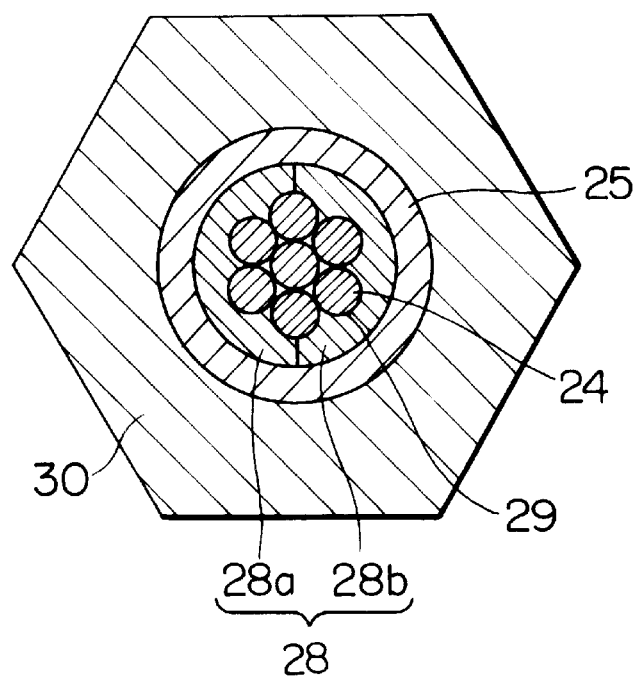
FIG. 10 is a cross-sectional view of section A—A in FIG. 9.

FIG. 10 is a cross-sectional view of section A—A in FIG. 9.

In these drawings, the number 23 indicates a stranded conductor comprised in the same manner as that of the second embodiment above; more specifically, the number indicates a stranded conductor having a stranded conductor layer 25 such as aluminum or an aluminum alloy wound around a tension member 24 of multiple stranded resin-reinforced carbon fibers in which the carbon fibers are bonded by a resin such a s heat-resistant epoxy resin.

Referring to FIG. 9, a termination or terminal end portion or section of stranded conductor 23 towards dead-end 26 is cut back to expose tension member 24. The exposed tension member 24 is inserted into tension member insertion tube 26a of eye-type steel dead-end 26 and adhesively fastened into place by cure-hardening resin 27. That is, on one termination surface of eye-type steel dead-end 26 has been formed tension member insertion hole 26a; and, on its central outer periphery has been formed helical or ringed corrugations 26b. As tension member 24 is inserted into tension member insertion tube 26a, cure-hardening resin 27 is packed and hardened within a gap or space between tension member 24 and the inner wall of tension member insertion tube 26a, so that tension member 24 and steel dead-end 26 are connected and fixed into place.

In another section of stranded conductor 23, between stranded conductor layer 25 and tension member 24 is positioned a buffer sleeve 28 like that described in the second embodiment shown in FIG. 5; that is, a buffer sleeve 28, like that shown in FIG. 8A and FIG. 8B, made up symmetrical semi-cylinders or buffer sleeve parts 28a and 28b, that are formed from a metal having zinc as its main constituent or a metal having aluminum as its main constituent, i.e. zinc alloys and aluminum alloys, as shown in FIG. 9.

Each of buffer sleeve parts 28a and 28b have, formed on their inner periphery, a mating surface 29, that mates to the outer periphery of tension member 24 such that when the buffer sleeve 28 is placed in position the mating surface 29 of each of the buffer sleeve parts 28a and 28b are mated to tension member 24.

Along the outside of these elements, i.e., buffer sleeve 28, tension member insertion tube 26a, and helical or ringed corrugations 26b of dead-end 26, is fit an aluminum or aluminum alloy sleeve 30. Although sleeve 30 that runs from above steel dead-end 26 along stranded conductor layer 25 under which has been inserted buffer sleeve 28, sleeve 30 is then compressed and fixed into place only over ranges P1 and P2 as shown in FIG. 9 or, in other words, over steel dead-end 26 and the section of stranded conductor layer 25 under which buffer sleeve 28 has been inserted but not over the area in which cure-hardening resin 27 has been packed. In this embodiment, the compressed portion or section of sleeve 30 that is over steel dead-end 26, and is indicated by P2, very nearly agrees or corresponds with the portion over which corrugations 26b have been formed on the outer periphery of dead-end 26.

A stranded conductor tension clamp of the structure shown in FIG. 9 is configured, for example, as follows.

First, a termination or terminal end portion or section of stranded conductor 23 towards dead-end 26 is cut back to expose tension member 24. Next, stranding at the termination of stranded conductor layer 25 is untwisted to further expose tension member 24. Then, buffer sleeve 28, made beforehand in a factory, is mated over the outer periphery of tension member 24 that has been exposed by untwisting the stranding; and, over this, the untwisted stranding is retwisted. Afterwards, the exposed part of tension member 24 is inserted into tension member insertion hole or tube 26a of steel dead-end 26; and within that is packed and hardened an epoxy type cure-hardening resin 27. The resin preferably has a viscosity of 100 poise or less and is comprised of, for example, bisphenol A epoxy type resin to which aliphatic amine has been added as a curing agent. Then, over the outside of these elements is pulled in and fit an aluminum or aluminum alloy sleeve 30. Opposite end sections of sleeve 30, not over the intermediate or cure-hardening resin 27 packing section, are compressed from the outside to a cross-sectional substantially hexagonal shape, thereby fixing aluminum or aluminum alloy sleeve 30 to steel dead-end 26 and stranded conductor 23.

In a stranded conductor tension clamp formed in the way, the cure-hardening resin 27 packing section, that connects and fastens tension member 24 and steel dead-end 26, is not subjected to the force that occurs when aluminum or aluminum alloy sleeve 30 is compressed. Accordingly, tension member 24 and steel dead-end 26 are firmly bonded together without any damage to cure-hardening resin 27 or any reduction in adhesive force.

Also, due to buffer sleeve 28 positioned between tension member 24 and a terminal end section of stranded conductor layer 25 oppisite dead-end 26, aluminum or aluminum alloy sleeve 30, aluminum or aluminum alloy sleeve 30 is strongly compress-fit above stranded conductor layer 25 of stranded conductor 23 without damage to tension member 24.

Aluminum or aluminum alloy sleeve 30 has sufficient gripping strength even for steel dead-end 26; and, especially in cases in which steel dead-end 26 is provided with corrugations 26b as described above, a stronger holding strength is obtained, so that an extremely high tensile strength is possessed overall.

In the embodiment shown in FIG. 9, tension member 24 is directly gripped by steel dead-end 26, and can be made more compact than the second embodiment shown in FIG. 5.

A non-woven fabric or a metal die casting layer, similar to those explained for the second embodiment shown in FIG.

5 may, in place of buffer sleeve 28, be placed between the termination or terminal end portion or section of stranded conductor layer 25 and tension member 24.

All of the above embodiments are examples in which the invention is applied to a tension clamp for stranded conductor having a tension member of stranded resin-reinforced carbon fiber, but it may also be applied in the same way to stranded conductor having a tension member of only carbon fiber, a tension member made or composed of with resin hard steel wires and carbon fiber, or a tension member of other types. Furthermore, the invention is not limited to the eye-type steel dead-end used in the above embodiments and may also be applied to tension clamps that pass through the pulley blacks or mid-spanjoint sleeves.

By the invention as described above, it is possible to attach, with good workability and sufficient tensile strength, a stranded conductor that has a tension member comprised mainly of carbon fiber.

What is claimed is:

1. An apparatus comprising a tension clamp for a conductor having a tension member comprising carbon fiber and a stranded conductor layer wound around the tension member, the apparatus comprising:

a tension member comprising an exposed end section;

a stranded conductor layer wound around the tension member, the stranded conductor layer comprising a stranded conductor layer end section;

a metal fitting substantially directly attached to the exposed end section of the tension member, the metal fitting comprising a tension member insertion section, a peripheral wall of which forms a slit section comprising multiple longitudinal slits, the metal fitting housing the exposed end section of the tension member within the slit section of the tension member insertion section; and a metal sleeve compress-fitted on the stranded conductor layer end section and the tension member insertion section whereby the multiple longitudinal slits of the slit section of the tension member insertion section are closed by fitting the metal sleeve in place from the stranded conductor layer end section over to the metal fitting and compressing the metal sleeve.

2. An apparatus comprising a tension clamp for a conductor in accordance with claim 1, wherein the tension member comprises resin-reinforced carbon fiber formed by bonding carbon fiber with resin.

3. An apparatus comprising a tension clamp for a conductor in accordance with claim 1, wherein the metal sleeve has a cross sectional shape compressed into a substantially regular hexagon, and wherein the slit section comprising multiple longitudinal slits comprises four slits positioned in correspondence to a compression surface of the metal sleeve and formed so that the slits are positioned at alternating angular spacings of about 60 degrees and about 120 degrees.

4. An apparatus comprising a tension clamp for a conductor in accordance with claim 2, wherein the metal sleeve has a cross sectional shape compressed into a substantially regular hexagon, and wherein the slit section comprising multiple longitudinal slits comprises four slits positioned in correspondence to a compression surface of the metal sleeve and formed so that the slits are positioned at alternating angular spacings of about 60 degrees and about 120 degrees.

5. An apparatus comprising a tension clamp for a conductor having a tension member comprising carbon fiber and a stranded conductor layer wound around the tension member, the apparatus comprising:

a tension member comprising an end section;

a stranded conductor overlapping layer wound around the tension member;

a buffer layer between the end section of the tension member and the stranded conductor overlapping layer; and a metal sleeve compress-fitted into place on an end of the stranded conductor overlapping layer.

6. An apparatus comprising a tension clamp for a conductor in accordance with claim 5, wherein the tension member comprises resin-reinforced carbon fiber formed by bonding carbon fiber with resin.

7. An apparatus comprising a tension clamp for a conductor in accordance with claim 5, wherein the buffer layer comprises a non-woven fabric layer wrapped over the end section of the tension member.

8. An apparatus comprising a tension clamp for a conductor in accordance with claim 7, wherein the tension member comprises a resin-reinforced carbon fiber layer formed by bonding carbon fiber with resin.

9. An apparatus comprising a tension clamp for a conductor in accordance with claim 5, wherein the buffer layer comprises a non-woven fabric layer wrapped over the end section of the tension member and another fabric placed between the non-woven fabric layer and the end section of the tension member.

10. An apparatus comprising a tension clamp for a conductor in accordance with claim 9, wherein the tension member comprises resin-reinforced carbon fiber formed by bonding carbon fiber with resin.

11. An apparatus comprising a tension clamp for a conductor in accordance with claim 5, wherein the buffer layer comprises a metal die casting layer formed by die casting a metal comprising zinc directly above the end section of the tension member.

12. An apparatus comprising a tension clamp for a conductor in accordance with claim 11, wherein the tension member comprises resin-reinforced carbon fiber formed by bonding carbon fiber with resin.

13. An apparatus comprising a tension clamp for a conductor in accordance with claim 5, wherein the buffer layer comprises a buffer sleeve having a cylindrical metal body of a split structure, the cylindrical metal body comprising an inner periphery having a mating surface that mates to an outer periphery of the tension member.

14. An apparatus comprising a tension clamp for a conductor in accordance with claim 13, wherein the buffer sleeve comprises a metal comprising at least one member from a group consisting of zinc and aluminum.

15. An apparatus comprising a tension clamp for a conductor in accordance with claim 13, wherein the tension member comprises resin-reinforced carbon fiber formed by bonding carbon fiber with resin.

16. A buffer sleeve comprising a conductor having a tension member comprising carbon fiber and a stranded conductor layer wound around the tension member positioned between an end section of the tension member and an end of the stranded conductor layer of the conductor for reducing compressive force loading on the end section of the tension member during compression of a metal sleeve fitted over the end of the stranded conductor layer of the conductor, the buffer sleeve comprising:

a cylindrical metal body of a split structure comprising an inner periphery having a mating surface that mates to an outer periphery of the tension member.

17. A buffer sleeve in accordance with claim 16, wherein the cylindrical metal body comprises a metal comprising at least one member selected from a group consisting of zinc and aluminum.

18. An apparatus comprising a tension clamp for a conductor comprising a tension member comprising carbon fiber and a stranded conductor layer wound around the tension member, the apparatus comprising:
   a tension member comprising an exposed end section;
   a stranded conductor layer wound around the tension member;
   a metal fitting attached to the exposed end section, the metal fitting comprising a tension member insertion section, the metal fitting housing the exposed end section of the tension member within the tension member insertion section;
   cure-hardening resin, packed and solidified between the metal fitting and the exposed end section of the tension member;
   a buffer layer between an end of the stranded conductor layer and the tension member; and
   a metal sleeve placed over the metal fitting from the end of the stranded conductor layer and compress-fitted into place.

19. An apparatus comprising a tension clamp for a conductor in accordance with claim 18, wherein the tension member comprises resin-reinforced carbon fiber formed by bonding carbon fiber with resin.

20. An apparatus comprising a tension clamp for a conductor in accordance with claim 18, wherein the buffer layer comprises a non-woven fabric layer wrapped over the tension member.

21. An apparatus comprising a tension clamp for a conductor in accordance with claim 18, wherein the buffer layer comprises a non-woven fabric layer wrapped over the tension member and a fabric placed between the non-woven fabric wrapped layer and the tension member.

22. An apparatus comprising a tension clamp for a conductor in accordance with claim 18, wherein the buffer layer comprises a metal die casting layer formed by die casting a metal comprising zinc directly above the tension member.

23. An apparatus comprising a tension clamp for a conductor in accordance with claim 18, wherein the buffer layer comprises a buffer sleeve having a cylindrical metal body of a split structure, the cylindrical metal body comprising an inner periphery having a mating surface that mates to an outer periphery of the tension member.

24. An apparatus comprising a tension clamp for a conductor in accordance with claim 18, wherein the metal sleeve is compressed over a part of the metal fitting, and over the stranded conductor layer, wherein the part does not include a portion of the metal fitting over the cure-hardening resin packing section.

* * * * *